United States Patent [19]

Banucci et al.

[11] 4,314,047
[45] Feb. 2, 1982

[54] PARTICULATED POLYETHERIMIDE AND METHOD FOR MAKING

[75] Inventors: Eugene G. Banucci, Scotia; Edith M. Boldebuck, Schenectady, both of N.Y.

[73] Assignee: General Electric Company, Schenectady, N.Y.

[21] Appl. No.: 170,763

[22] Filed: Jul. 21, 1980

Related U.S. Application Data

[63] Continuation of Ser. No. 37,437, May 9, 1979, abandoned.

[51] Int. Cl.³ .................. C08G 69/28; C08G 69/30; C08G 73/10
[52] U.S. Cl. .................................. 528/26; 428/458; 428/473.5; 528/27; 528/28; 528/125; 528/126; 528/128; 528/185; 528/208
[58] Field of Search ............. 528/125, 126, 128, 185, 528/208, 26, 27, 28

[56] References Cited

U.S. PATENT DOCUMENTS

| | | | |
|---|---|---|---|
| 3,833,544 | 9/1974 | Takekoshi et al. | 528/28 |
| 3,833,546 | 9/1974 | Takekoshi et al. | 528/28 X |
| 3,847,867 | 11/1974 | Heath et al. | 528/185 |
| 3,905,942 | 9/1975 | Takekoshi et al. | 528/185 |
| 3,983,093 | 9/1976 | Williams et al. | 528/185 |
| 3,989,670 | 11/1976 | Takekoshi et al. | 528/208 |
| 4,048,142 | 9/1977 | Takekoshi | 528/208 |
| 4,073,773 | 2/1978 | Banucci et al. | 528/208 |
| 4,157,996 | 6/1979 | Boldebuck et al. | 528/185 |
| 4,197,396 | 4/1980 | Banucci et al. | 528/125 |
| 4,221,897 | 9/1980 | Takekoshi | 528/125 |
| 4,281,100 | 7/1981 | Takekoshi | 528/128 X |

OTHER PUBLICATIONS

Dine-Hart et al., J. of Applied Poly. Sci. vol. 11, pp. 609–627, (1967).
Kreuz et al., J. of Poly. Sci., (1966), pp. 2607–2616.
Adrova et al., Polyimides (1970), pp. 27–44.
Laivs et al., Polymer Sci. USSR (1967), pp. 2470–2478.

*Primary Examiner*—Howard E. Schain
*Attorney, Agent, or Firm*—William A. Teoli; James C. Davis, Jr.

[57] ABSTRACT

Finely divided polyetherimide is provided which can be used in a variety of applications. These oligomers, in the form of fine powders, are particularly useful for coating wire by a power coating technique.

1 Claim, No Drawings

PARTICULATED POLYETHERIMIDE AND METHOD FOR MAKING

This is a continuation, of application Ser. No. 37,437, filed May 9, 1979, now abandoned.

CROSS REFERENCE TO RELATED APPLICATIONS

Reference is made to Banucci et al Ser. No. 788,248, filed Apr. 18, 1977, now U.S. Pat. No. 4,098,800, for Process For Preparing Polyetheramide-acids; copending application RD-11113 of Tohru Takekoshi for Polyetherimide Prepolymers and Method for Making, filed concurrently herewith; copending application RD-10316 of Tohru Takekoshi for A Method of Making a Polyetherimide Prepolymer, filed concurrently herewith, where all of the aforementioned applications are assigned to the same assignee as the present invention.

BACKGROUND OF THE INVENTION

As shown by Banucci et al U.S. Pat. No. 4,098,800, assigned to the same assignee as the present invention, particulated oligomeric polyetheramide acids can be made by effecting reaction between (a) an aromatic bis(ether anhydride) of the formula,

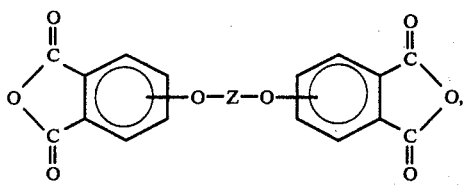
(1)

and (b) mixtures of one or more of said bis(ether anhydride)s with up to 30 mole percent benzophenone dianhydride of the general formula,

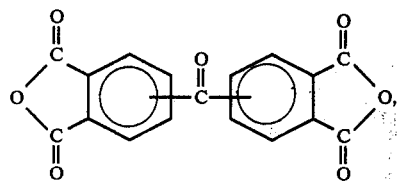
(2)

with at least one organic diamine of the general formula, (3) $H_2N-R-NH_2$, in an inert organic liquid selected from the group consisting of (c) chlorinated hydrocarbon selected from the group consisting of methylene chloride, chloroform, 1,2-dichloroethane, and mixtures thereof and (d) mixtures of said chlorinated hydrocarbon with up to 50% by weight of acetone to form oligomeric polyetheramide-acid which is substantially insoluble in said liquid, where Z is a member selected from

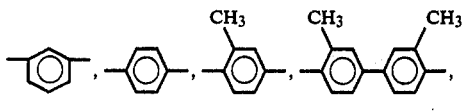

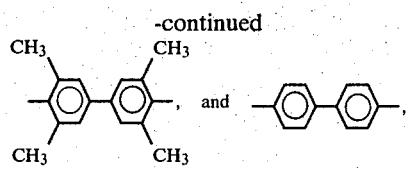

and divalent organic radicals of the general formula,

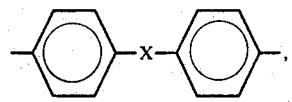

where X is a member selected from the class consisting of divalent radicals of the formulas, $-C_yH_{2y}-$,

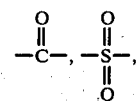

$-O-$ and $-S-$, where y is an integer from 1 to 5, and R is a divalent organic radical selected from the class consisting of aromatic hydrocarbon radicals having from 6 to about 20 carbon atoms and halogenated derivatives thereof, alkylene radicals having from 2 to about 20 carbon atoms, cycloalkylene radicals having from 3 to about 20 carbon atoms, from $C_2$ to about $C_8$ alkylene terminated polydiorganosiloxane and divalent radicals of the general formula,

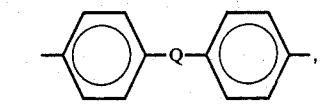

where Q is a member selected from the class consisting of $-O-$, $-S-$, and $-C_xH_{2x}-$, where x is an integer from 1 to 5.

It has been found that the above-described particulated polyetheramideacids of Banucci et al are useful in various coating applications, for example, applications to aluminum or copper wire using fluid bed electrostatic coating procedures. However, these electrostatically applied oligomeric powders can readily form films containing entrapped bubbles which reduce the insulating characteristics of the polyetherimide coating. It has now been discovered that substantially bubble-free films can be made by preheating the particulated, substantially organic solvent-free polyetheramide acid, preferably in an oxygen-free atmosphere and at a temperature in the range of 135° C. to 175° C. for a period of time sufficient to effect at least 70% imidization of the organic solvent-free polyetheramide acid without causing a substantial degree of sintering or agglomeration of the polyethermide powder. This result is quite surprising since the imidization of the particulated polyetheramide acid occurs in the absence of an organic solvent.

STATEMENT OF THE INVENTION

There is provided by the present invention, particulated, substantially organic solvent-free polyetherimide having at least 50 mol percent of imide radicals based on the total mols of imide radicals and amide acid radicals and an average particle size in the range of 0.5 to 70 microns, which is meltable or sinterable at temperatures up to 225° C. and capable of being converted to a substantially bubble-free flexible film upon being heated at a temperature in the range of from about 225° C. to 325° C. and in substance as high as 400° C.

The particulated polyetherimide of the present invention can be further characterized as being particulated organic solvent-free polyetheramide acid consisting essentially of chemically combined amide acid units of the formula,

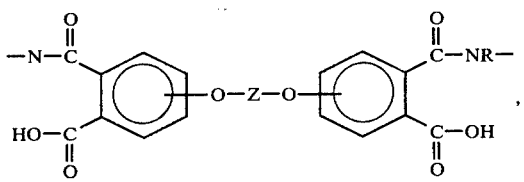

which has been heated at a temperature in the range of about 135° C. to 175° C. until the resulting particulated product consists essentially of about 70 mole percent of chemically combined imide units of the formula,

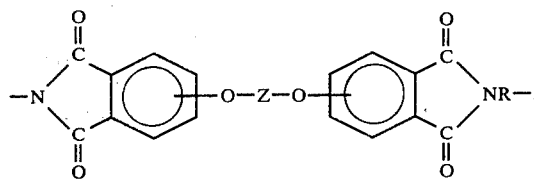

where Z and R are as previously defined, based on the total moles of chemically combined imide units and amide acid units without a substantial degree of sintering occuring in the polyetheramideacid during the aforementioned heat treatment where the polyetheramideacid is the product of reaction of organic dianhydride and organic diamine utilized in a mol ratio of 1 mol of organic dianhydride, per 1 to 1.5 mol of organic diamine, where the organic dianhydride is selected from the group consisting of (A) aromatic bis(ether anhydride)s of formula (1) and (B) mixtures of 1 or more of said bis(etheranhydride)s with up to 30 mol percent of benzophenone dianhydride of formula (2), with at least one organic diamine of formula (3), where said polyetheramide acid reaction product has a number average molecular weight of below about 5000.

Aromatic bis(ether anhydride)s of formula (1) include, for example:
2,2-bis[4-(3,4-dicarboxyphenoxy)phenyl]propane dianhydride;
4,4'-bis(3,4-dicarboxyphenoxy)diphenyl ether dianhydride;
4,4'-bis(3,4-dicarboxyphenoxy)diphenyl sulfide dianhydride;
4,4'-bis(3,4-dicarboxyphenoxy)benzophenone dianhydride;
4,4-bis(3,4-dicarboxyphenoxy)diphenyl sulfone dianhydride;
2,2-bis[4-(2,3-dicarboxyphenoxy)phenyl]propane dianhydride;
4,4'-bis(2,3-dicarboxyphenoxy)diphenyl ether dianhydride;
4,4'-bis(2,3-dicarboxyphenoxy)diphenyl sulfide dianhydride;
4,4'-bis(2,3-dicarboxyphenoxy)benzophenone dianhydride
4,4'-bis(2,3-dicarboxyphenoxy)diphenyl sulfone dianhydride;
4-(2,3-dicarboxyphenoxy)-4'-(3,4-dicarboxyphenoxy)-diphenyl-2,2-propane dianhydride, and mixtures thereof.

Aromatic bis(ether anhydride)s especially preferred herein are 2,2-bis[4-(3,4-dicarboxyphenoxy)phenyl]propane dianhydride, 2,2-bis[4-(2,3-dicarboxyphenoxy)-phenyl]propane dianhydride; 4-(2,3-dicarboxyphenoxy)-4'-(3,4-dicarboxyphenoxy) diphenyl-2,2-propane dianhydride; and mixtures thereof.

Some of the aromatic bis(ether anhydride)s of formula (1) are shown in U.S. Pat. No. 3,972,902 (Darrell Heath and Joseph Wirth). As described therein, the bis(ether anhydride)s can be prepared from the hydrolysis, followed by dehydration, of the reaction product of a nitro-substituted phenyl dinitrile with a metal salt of a dihydric phenol compound in the presence of a dipolar aprotic solvent.

Additional aromatic bis(ether anhydride)s also included by formula (1) are shown by Koton, M. M. Florinski, F. S. Bessonov, M. I. Rudakov, A. P. (Institute of Heteroorganic Compounds, Academy of Sciences, (U.S.S.R.), U.S.S.R. 257,010, Nov. 11, 1969, Appl. May 3, 1967, and by M. M. Koton, F. S. Florinski, Zh, Org. Khin, 4 (5), 774 (1968).

The organic diamines of formula (3) include, for example:
o-phenylenediamine,
m-phenylenediamine,
p-phenylenediamine,
4,4'-diaminodiphenylpropane,
4,4'-diaminodiphenylmethane (commonly named 4,4'-methylenedianiline),
4,4'-diaminodiphenyl sulfide (commonly named 4,4'-thiodianiline),
4,4'-diaminodiphenyl ether (commonly named 4,4'-oxydianiline),
1,5-diaminonaphthalene,
3,3'-dimethylbenzidine,
3,3'-dimethoxybenzidine,
2,4-bis(β-amino-t-butyl)toluene,
bis(p-β-amino-t-butyl)ether,
bis(p-β-methyl-o-aminopentyl)benzene,
1,3-diamino-4-isopropylbenzene,
1,2-bis(3-aminopropoxy)ethane,
benzidine,
m-xylylenediamine,
p-xylylenediamine,
2,4-diaminotoluene
2,6-diaminotoluene,
bis(4-aminocyclohexyl)methane,
3-methylheptamethylenediamine,
4,4-dimethylheptamethylenediamine,
2,11-dodecanediamine,
2,2-dimethylpropylenediamine,
octamethylenediamine,
3-methoxyhexamethylenediamine,
2,5-dimethylhexamethylenediamine,
2,5-dimethylheptamethylenediamine,
3-methylheptamethylenediamine,
5-methylnonamethylenediamine,
1,4-cyclohexanediamine,
1,12-octadecanediamine, bis(3-aminopropyl)sulfide,
N-methyl-bis(3-aminopropyl)amine,
hexamethylenediamine,
heptamethylenediamine,
nonamethylenediamine,
decamethylenediamine,
bis(3-aminopropyl)tetramethyldisiloxane,
bis(4-aminobutyl)tetramethyldisiloxane, and mixtures of such diamines.

Organic diamines preferred herein are 4,4'-methylenedianiline, 4,4'-oxydianiline, metaphenylenediamine, and mixtures thereof.

Benzophenone dianhydrides included by formula (2) include 3,3',4,4'-benzophenone tetracarboxylic acid dianhydride, 2,2',3,3'-benzophenone tetracarboxylic acid dianhydride, and mixtures thereof. The 3,3',4,4'-isomer is preferred and is referred to herein for simplicity as BTDA.

In the practice of the invention, particulated oligomeric polyetheramide acids or "polyamide acid" consisting essentially of chemically combined units of formula (4), can be heated at temperatures in the range of 135° C. to 175° C. for a period of 1 hour or less to 24 hours or more, based on the nature of the polyetheramide acid.

As disclosed by Banucci et al, the polyamide acid can be made by using from about 1 to about 1.5 mole of organic diamine, per mole of organic dianhydride. In general, the characteristics of the polyamideacid, i.e., its ability to be crosslinked for desirable wire coating characteristics, can be influenced by the amine content of the polyamide acid and the nature of the amine.

An alternative procedure for determining whether heat treatment of the polyamide acid has been sufficient is to titrate the polyamide acid prior to heating and subsequent to the heat treatment, which as previously defined, in heating the polyamide acid at a temperature in the range of 135° C. to 175° C. without sintering the particulate. Preferably, heating is accomplished under a non-oxidizing atmosphere, which can be achieved by using an inert gas such as nitrogen, argon, etc. Residual polyamide acid of less than about 30 mole percent is preferred, based on the total moles of polyamide acid originally titrated and can provide oligomer having desirable melt flow properties and convertible to bubble-free films.

The amine content, anhydride content and amide acid content of the oligomers prepared in the following examples were determined using the potentiometric titration procedures next described. Amine content was determined by dissolving a known amount (approximately 0.2 gram) of sample in 25 cc of liquified phenol (approximately 90 parts phenol and 10 parts water) and thereafter titrating with approximately 0.18 N methanesulfonic acid dissolved in a mixture of 150 parts by volume of methanol and 70 parts by volume of benzene. Amideacid and anhydride content were determined by dissolving a known amount (about 0.05 gram) of sample in a mixture of 1 cc water and 2 cc N-methyl-2-pyrrolidone. After allowing one hour for hydrolysis of any anhydride present to dicarboxylic acid end groups, 25 cc of pyridine was added and the sample was titrated with approximately 0.08 N tetrabutylammonium hydroxide (TBAH) prepared by diluting 1 N methanolic TBAH with 100/30 methanol benzene solution. (The two acid groups derived from the anhydride hydrolysis are stronger and weaker, respectively, than the amideacid). If anhydride was present in the original unhydrolyzed sample, the stronger anhydride-derived carboxylic acid titrates first with a rather poorly defined end-point (A). The amide acid titrates next, with a well-defined end point (B). The weaker anhydride-derived carboxylic acid titrates last, as indicated by a well-defined end point (C) if no imide is present. In such instance, the anhydride content in the original sample is considered equivalent to the milliequivalents (meq) of base consumed from end-point B to end-point C. The amide acid in the sample is considered equivalent to total base consumed up to end-point B minus the anhydride content. If imide is present, the end-point for the weaker carboxylic acid is less well-defined because imide ring opening commences as soon as the weak acid has been neutralized. In this instance the choice of end point C is less well-defined and the values for the strong and weak anhydride-derived carboxylic acids are averaged to compute the anhydride content of the original sample. Oligomers prepared at a mole ratio of diamine to dianhydride greater than 1.0 will usually contain no anhydride end groups, and titration of the initial polyamide acid according to the above procedure will give only one end point B from which the milliequivalents of amide acid per gram of sample can be calculated directly. The amount of imide present, if any, can be determined by the procedure described in U.S. Pat. No. 3,892,716 (Edith Boldebuck).

The time and temperature at which a polyamide acid powder can be conveniently heat-treated to produce at least 50% imidization will depend on the sintering temperature of the sample and also on the amount of amine end groups. Oligomers prepared at higher mole ratio of diamine to dianhydride can be effectively imidized more rapidly and at lower temperatures than oligomers prepared from equal mole ratios of diamine and dianhydride. To determine a suitable time and temperature for imidization, a polyamide acid powder can be heated for about two hours at a temperature about 10° to 15° C. lower than the sintering temperature. A sample of the heat-treated powder is then titrated to determine the amide acid content and imide content. The percent imidization is calculated as $$\frac{(\text{meq. imide per g sample}) \times 100}{(\text{meq. imide} + \text{meq. amide acid}) \text{ per g sample}}$$

If the percent imide in the heated sample is less than the desired amount, the partially-imidized polyamide acid can be heated further to continue the imidization, using either a longer heating time or by carrying out the imidization at a somewhat higher temperature.

Particle size was measured using the Coulter Counter technique with the powder suspended in 3 percent aqueous sodium chloride.

In order that those skilled in the art will be better able to practice the present invention, the following examples are given by way of illustration and not by way of limitation. All parts are by weight.

EXAMPLE 1

Particulated polyetheramide acid was prepared by the following procedure:

A 5% solution of 2,2-bis[4-(3,4-dicarboxyphenoxy)-phenyl]propane dianhydride (BPADA) was prepared by dissolving 6.50 grams (0.0125 mole) in a sufficient amount of methylene chloride in a first flask. A 5% solution of 4,4'-methylene dianiline (MDA) was prepared by dissolving 2.47 grams (0.0125) moles of MDA in a sufficient amount of methylene chloride in a second flask. The BPADA solution and the MDA solution were added rapidly and simultaneously with vigorous stirring, at room temperature (about 21°-25° C.) to a 500-milliliter breaker, resulting in formation of a precipitate product within several seconds. Stirring was continued for about 10 minutes and thereafter the precipitate product was separated from the reaction mixture by filtration. The product was washed with methylene chloride and thereafter dried under vacuum at room temperature to provide finely divided free flowing particles. Based on method of preparation and titration of the product for amine content, anhydride content, and amide acid content, the product was a low molecular weight oligomeric polyetheramide acid adduct of MDA and BPADA, substantially all the end groups of which were amine groups. The number average molecular weight ($\overline{MW_n}$) of the polyetheramide acid was 2857 as calculated from the formula:

$$\overline{MW_n} = \frac{2 \times 1000}{\text{milliequivalents of amine/gram}}.$$

Additional particulated polyetheramide acid employing different mol ratios of BPADA and MDA were also prepared; unlike the above procedure, based on filtering the reaction mixture, the precipitated polyetheramide acid was recovered by removing the solvent under reduced pressure.

The various polyetheramide acid samples were then analyzed for milliequivalents of amine per gram by potentiometric titration with methane sulfonic acid using phenol:water (90:10) as solvent. The various polyetheramide acid samples were then heated to imidize them in accordance with three different cycles at a temperature of 143° C. for 1-4 hours, a temperature of 165° C. for 1-2 hours and at 175° C. for ½-1 hour. In each heating cycle, the fresh polyetheramide acid powder was used. The following results were obtained, where "% Imide" indicates the initial degree of imidization prior to heating, while "degree of Imidization" shows the extent of how far the particulated polyetheramide acid imidized. The imide content of the oligomer was determined by titration in accordance with the method of Boldebuck U.S. Pat. No. 3,737,478. In addition, the sintering temperatures, i.e., the temperature at which the powder is converted from the free flowing state to an agglomerated state of the various polyetheramide acid powders are also shown.

TABLE I

| Composition BPADA:MDA | Meq Amine per gram | Sintering °C. temp. | Initial imide % | Degree of Imidization (%) | | | | | | |
|---|---|---|---|---|---|---|---|---|---|---|
| | | | | 143° C. | | | 165° C. | | 175° C. | |
| | | | | 1 hr | 2 hr | 4 hr | 1 hr | 2 hr | ½ hr | 1 hr |
| 1:1 | .08 | 195 | 0 | 13 | 23 | 30 | 24 | 55 | 45 | 64 |
| 2:3 | 1.29 | 165 | 7 | 52 | 82 | 97 | 93 | 98 | — | — |
| 3:4 | .83 | 185 | 6 | 32 | 44 | 62 | 62 | 96 | — | — |
| 4:5 | .68 | 195 | 6 | 26 | 36 | 50 | 56 | 92 | — | — |
| 5:6 | .64 | 195 | 0 | 25 | 36 | 48 | 54 | 83 | 82 | 96 |
| 6:7 | .62 | 195 | 2 | 23 | 34 | 47 | 50 | 82 | 77 | 89 |
| 7:8 | .51 | 195 | 0 | 17 | 30 | 36 | 46 | 78 | 75 | 90 |

The above results show that amine end group content has a significant effect on the sintering temperature and on the imidization rate of the polyetheramide acid.

EXAMPLE 2

A polyetheramide acid was prepared in accordance with the procedure of Example 1 utilizing equal molar amounts of the BPADA and the methylene dianiline. The resulting particulated organic solvent-free polyetheramide acid was found to contain 0.19 milliequivalents of anhydride end groups per gram and 2.37 milliequivalents of amide acid per gram by titration. A portion of the polyetheramide acid was then imidized utilizing a temperature of 165° C. for a period of 1-4 hours, to serve as a control sample. Additional samples of the polyetheramide acid were also treated with either dimethylamine (B) or trimethyl amine (C) at 25° C. by exposing the polyetheramide acid powder to the amine vapor several times after flushing between each exposure with nitrogen until a constant weight was obtained. The amine treated polyetheramide acid powder was also titrated for amine content after the gaseous amine treatment to consistant weight and then after 4 hours under flowing nitrogen at 165° C. The imidized powders were then converted to films by a melt drawing technique or by being cast from N-methylpyrrolidone and the resulting film was then cured for ½ hour at 300° C. The following results were obtained:

TABLE II

| Sample | meq amine per g | | Extent of Imidization, % after 165° C. | | | Cut through* temp of film cured ½ hr |
|---|---|---|---|---|---|---|
| | Initial | 4 hrs 165° C. | 1 hr | 2 hr | 4 hr | 300° C. |
| Control | .29 | .16 | 49 | 60 | 69 | 308° |
| Control + dimethylamine (saturated at 25° C.) | 2.51 | .49 | 80 | 85 | 85 | — |
| Control + trimethylamine (saturated at 25° C.) | 1.22 | .27 | 81 | 87 | 90 | 275° |

*Three mil thick film was placed between two crossed non-insulated copper wires, and tested according to ASTM D1676.

The above results establish that the polyetheramide acid can be successfully vapor treated in the solid state with a volatile organic amine. In addition, the volatile organic amine treatment enhances the rate of imidization.

EXAMPLE 3

In accordance with the procedure of Example 1, additional polyetheramide acid powders were made which were imidized at 165° C. in a nonoxidizing atmosphere for about 2 hours. The imidized powders were then melt drawn on aluminum at about 250° C. and thereafter heated at 300° C. for ½ hour. The following results were obtained when the cut through was measured under a 1 kilogram load between 50.8 mil crossed wires.

TABLE III

| Composition BPADA:MDA | Average Cut-through Temp. | Flexibility* |
|---|---|---|
| 1:1 | 270° C. | Pass |
| 2:3 | 325° C. | Borderline |
| 3:4 | 380° C. + | Pass |
|  | 345° C. | Pass |
| 4:5 | 380° C. + | Pass |
|  | 380° C. + | Pass |
| 5:5 | 350° C. + | Pass |
| 6:7 | 330° C. + | Pass |
| 7:8 | 310° C. | Pass |

*Film was bent and creased.

The above results show that the imidized powder made in accordance with the present invention can be converted to valuable films which establish that the powders could also be electrostatically coated onto a copper or aluminum conductor, and can be fused and cured to produce valuable insulating coatings.

EXAMPLE 4

Polyetheramide acid powder was prepared in accordance with the procedure of Example 1 utilizing BPADA in a mole ratio of one mole of BPADA per 1.2 moles of MDA. The resulting organic solvent-free polyetheramide acid powder was heated under nitrogen for 2 hours at approximately 170° C. The powder was found to be imidized to about 80%. The imidized polyetheramide acid was then electrostatically deposited onto a grounded aluminum foil utilizing a negative charged fluidized powder bed. The powder coated aluminum foil was then heated for 5 minutes in a 250° C. oven followed by 5 minutes in a 300° C. oven. There was obtained a polyetherimide coated aluminum foil having a cured polyimide film of about 5 mils thick free of bubbles and having excellent electrical integrity.

EXAMPLE 5

The organic solvent-free polyetheramide acid powder prepared in Example 4 which had not been heated at 170° C. was spread uniformly onto the flat surface of an aluminum cup. The cup was placed in a 250° C. air circulating oven and was examined after 5 minutes. The powder had fused into a 5 mil film which contained many bubbles and surface imperfections. After additional heating at 250° C. for 2½ hours the film still contained many bubbles. The film was found to be completely unsuitable for electrical insulation purposes.

The above procedure was repeated except that the polyetheramide acid was imidized under nitrogen for 2 hours at 170° C. There was obtained a particulated polyetherimide powder which did not show any significant degree of sintering. The powder was then spread in accordance with the previous procedure in an aluminum cup and then heated for 5 minutes at 250° C. in an air circulating oven. There was obtained a smooth bubble-free film approximately 5 mils in thickness after a period of about 5 minutes. The film was then heated for 2½ hours at 250° C. The film remained smooth and bubble-free and it was found to have a dielectric strength at 60 Hertz of about 12.8 kv. This established that the imidization in accordance with the method of the present invention at 2 hours at 170° C. was sufficient to overcome the problem of bubbling which characterized the polyetheramide-acid powder heated directly at 250° C.

Although the above examples are directed to only a few of the very many variables within the scope of the present invention, it should be understood that the present invention is directed to a much broader variety of polyetherimide oligomers and method for making such materials shown in the description preceding these examples. These polyetherimide powders can be further characterized in that they can be fused to useful and bubble-free films without use of external mechanical pressure at temperatures between 200° C. to 250° C. These films can be further heated to temperatures up to about 350° C. to flexibilize them.

What we claim as new and desire to secure by Letters Patent of the United States is:

1. A method for making particulated substantially organic solvent-free polyetherimide which comprises heating particulated substantially organic solvent-free polyetheramide acid consisting essentially of chemically combined units of the formula,

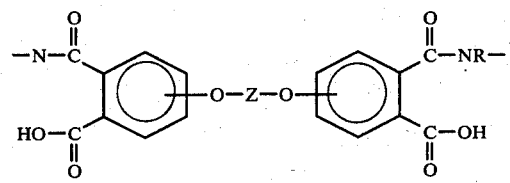

at a temperature in the range of from 135° C. to 175° C. until the resulting particulated product consists essentially of at least about 70 mole percent of chemically combined imide units of the formula,

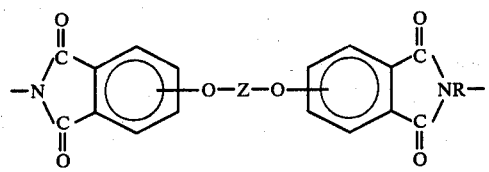

based on the total moles of chemically combined imide and amide acid units without a substantial degree of sintering occurring in the resulting particulated product, where the polyetheramide acid is the product of reaction of organic dianhydride and organic diamine utilized in a mole ratio of 1 mole of organic dianhydride, per 1 to 1.5 mole of organic diamine, where the organic dianhydride is selected from the group consisting of
   (A) aromatic bis(ether anhydride)s of the formula,

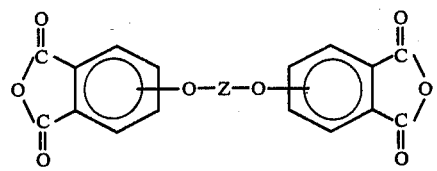

(B) mixtures of 1 or more of said bis(ether anhydride)s with up to 30 mole percent of benzophenone dianhydride of the formula,

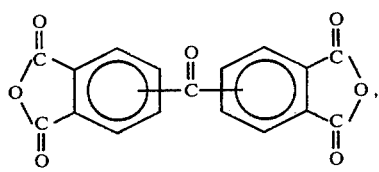

with at least one organic diamine of the formula,

H₂N—R—NH₂, where said polyetheramide acid reaction product has a number average molecular weight of below about 5000, where Z is a member selected from

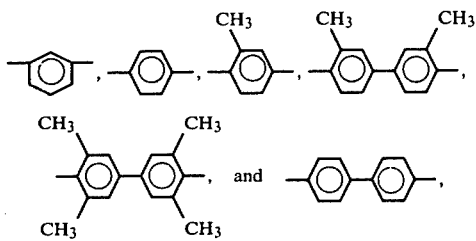

and divalent organic radicals of the general formula,

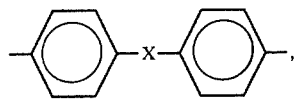

X is a member selected from the class consisting of divalent radicals of the formulas —C$_y$H$_{2y}$—, —C—,

—O—, and —S—, y is an integer from 1 to 5, and R is a divalent organic radical selected from the class consisting of aromatic hydrocarbon radicals having from 6 to about 20 carbon atoms and halogenated derivatives thereof, alkylene radicals having from 2 to about 20 carbon atoms, from C₂ to about C₈ alkylene terminated polydiorganosiloxane and divalent radicals of the general formula,

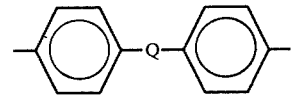

Q is a member selected from the class consisting of —O—, —S—, and —C₂H$_{2x}$—, where x is an integer from 1 to 5.

* * * * *